United States Patent
Lee et al.

(10) Patent No.: US 10,750,397 B2
(45) Date of Patent: Aug. 18, 2020

(54) METHOD OF SUPPORTING COMMUNICATION USING TWO OR MORE RADIO ACCESS TECHNOLOGIES AND APPARATUS FOR SAME

(71) Applicant: LG ELECTRONICS INC., Seoul (KR)

(72) Inventors: Eunjong Lee, Anyang-si (KR); Heejeong Cho, Anyang-si (KR); Jaehoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/528,733

(22) Filed: Aug. 1, 2019

(65) Prior Publication Data
US 2019/0357073 A1    Nov. 21, 2019

Related U.S. Application Data

(63) Continuation of application No. 15/250,689, filed on Aug. 29, 2016, now Pat. No. 10,419,961, which is a (Continued)

(51) Int. Cl.
*H04W 24/10* (2009.01)
*H04W 88/06* (2009.01)
(Continued)

(52) U.S. Cl.
CPC ........... *H04W 24/10* (2013.01); *H04W 36/30* (2013.01); *H04W 88/06* (2013.01); *H04W 74/00* (2013.01); *H04W 74/006* (2013.01)

(58) Field of Classification Search
CPC ................................................... H04W 88/06
(Continued)

(56) References Cited

U.S. PATENT DOCUMENTS 9,401,783 B1 *   7/2016   Agee ................... H04B 7/0413
2008/0002652 A1 *  1/2008   Gupta ............... H04L 25/03834
                                                                 370/338
(Continued)

FOREIGN PATENT DOCUMENTS

CN          1744551 A      3/2006
CN          101426236 A    5/2009
(Continued)

OTHER PUBLICATIONS

ETSI: LTE; Evolved Universal Terrestrial Radio Access (E-UTRA); Radio resource Control (RRC); Protocol specification (3GPP TS 36.331 version 10.6.0 Release 10); Technical Specification; XP-014070533; ETSI TS 136 331 v10.6.0, Jul. 2012.

*Primary Examiner* — Thomas J Lett
(74) *Attorney, Agent, or Firm* — Dentons US LLP

(57) ABSTRACT

A method of supporting communication using two or more heterogeneous radio access technologies (RAT) may include receiving, from a first communication network supporting a first RAT, a first message requesting notification as to whether access to a second communication network that simultaneously support the first communication network and a second RAT is supported; transmitting, to the base station in the first communication network, a second message including an indicator indicating whether to support simultaneous access to the first and second communication networks in response to the first message; and receiving a trigger condition for reporting a measurement result for the second communication network from the base station in the first communication network, when the indicator indicates that the terminal is able to access the first and second communication networks.

14 Claims, 8 Drawing Sheets

Related U.S. Application Data continuation of application No. 14/416,920, filed as application No. PCT/KR2013/006743 on Jul. 26, 2013, now Pat. No. 9,497,685.

(60) Provisional application No. 61/693,759, filed on Aug. 27, 2012, provisional application No. 61/692,241, filed on Aug. 23, 2012, provisional application No. 61/676,312, filed on Jul. 26, 2012.

(51) Int. Cl.
*H04W 36/30* (2009.01)
*H04W 74/00* (2009.01)

(58) Field of Classification Search
USPC .......................................................... 370/252
See application file for complete search history.

(56) References Cited

U.S. PATENT DOCUMENTS

| | | |
|---|---|---|
| 2009/0117891 A1 | 5/2009 | Chou |
| 2009/0279487 A1 | 11/2009 | Reumerman et al. |
| 2011/0014919 A1 | 1/2011 | Otte .................. H04W 36/0061 455/442 |
| 2011/0105112 A1 | 5/2011 | Cave et al. |
| 2012/0163296 A1 | 6/2012 | Cheon et al. |
| 2013/0230022 A1 | 9/2013 | Guo ....................... H04W 36/18 370/331 |
| 2015/0188681 A1 | 7/2015 | Li ......................... H04W 72/12 370/252 |

FOREIGN PATENT DOCUMENTS

| | | |
|---|---|---|
| CN | 101848497 A | 9/2010 |
| CN | 102131227 A | 7/2011 |
| CN | 102160419 A | 8/2011 |
| CN | 102238757 A | 11/2011 |
| CN | 102404809 A | 4/2012 |
| CN | 102457970 A | 5/2012 |
| JP | 2008-022581 A | 1/2008 |
| JP | 2008-508832 A | 3/2008 |
| JP | 2012-010352 A | 1/2012 |
| JP | 5612113 B2 | 9/2014 |
| KR | 10-2007-0012670 A | 1/2007 |
| KR | 1020100065388 A | 6/2010 |
| KR | 10-2012-0093412 A | 8/2012 |
| WO | 2008/157800 A1 | 12/2008 |
| WO | 2010/121191 A1 | 10/2010 |
| WO | 2011/096692 A2 | 8/2011 |
| WO | 2011/120577 A1 | 10/2011 |
| WO | 2011162572 | 12/2011 |
| WO | 2012/002771 A2 | 1/2012 |
| WO | 2012/011787 A2 | 1/2012 |
| WO | 2012/033774 A2 | 3/2012 |
| WO | 2012050387 | 4/2012 |
| WO | 2012/074878 A2 | 6/2012 |

\* cited by examiner

METHOD OF SUPPORTING COMMUNICATION USING TWO OR MORE RADIO ACCESS TECHNOLOGIES AND APPARATUS FOR SAME

This application is a continuation application of U.S. patent application Ser. No. 15/250,689 filed Aug. 29, 2016, which is a continuation of U.S. patent application Ser. No. 14/416,920 filed Jan. 23, 2015 (now issued as U.S. Pat. No. 9,497,685), which is the National Stage Application of International Application No. PCT/KR2013/006743 filed Jul. 26, 2013, which claims the benefit of U.S. Provisional Application No. 61/676,312 filed Jul. 26, 2012; 61/692,241 filed Aug. 23, 2012 and 61/693,759 filed Aug. 27, 2012, all of which are hereby incorporated by reference in their entirety for all purposes as if fully set forth herein.

TECHNICAL FIELD

The present invention relates to a wireless communication, and more particularly, to a method of supporting signal transmission and reception using two or more radio access technologies (RAT) and an apparatus therefor.

BACKGROUND ART

There may exist a multi-RAT user equipment capable of accessing two or more radio access technologies (RATs). In order to access a specific RAT, a connection to the specific RAT is established based on a request of a user equipment and then data transmission and reception may be performed. Yet, although the multi-RAT UE is capable of accessing two or more RATs, the multi-RAT UE is unable to access multiple RATs at the same time. In particular, although a user equipment is equipped with a multi-RAT capability, the user equipment is unable to simultaneously transmit and receive data via RATs different from each other.

Since a legacy multi-RAT technology corresponds to a switching-based multi-RAT technology, a data is transmitted in a manner of being switched by a different RAT. Hence, it is difficult to select a RAT appropriate for a flow characteristic. A solution for the aforementioned problem is not proposed yet.

DISCLOSURE OF THE INVENTION

Technical Tasks

One technical task intended to achieve by the present invention is to provide a method for a user equipment to support a signal transmission and reception using two or more radio access technologies (RATs).

Another technical task intended to achieve by the present invention is to provide a method for a base station to support a signal transmission and reception using two or more radio access technologies (RATs).

Another technical task intended to achieve by the present invention is to provide a user equipment supporting a signal transmission and reception using two or more radio access technologies (RATs).

The other technical task intended to achieve by the present invention is to provide a base station supporting a signal transmission and reception using two or more radio access technologies (RATs).

Technical tasks obtainable from the present invention are non-limited the above mentioned technical tasks. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of supporting signal transmission and reception using two or more radio access technologies (RATs), which is supported by a user equipment, includes the steps of receiving a first message, which requests information on whether access to a second communication network simultaneously supporting a first communication network and a second RAT is supported, from a base station of the first communication network supporting a first RAT, transmitting a second message, which includes an indicator indicating whether simultaneous access to the first communication network and the second communication network is supported, to the base station of the first communication network in response to the first message and if the indicator indicates that the user equipment is capable of accessing the first communication network and the second communication network, receiving a trigger condition from the base station of the first communication network to report a measurement result measured for the second communication network. A measurement target for the second communication network may correspond to at least one of a frequency and a data radio bearer (DRB) given by the second communication network. In this case, the data radio bearer may be configured to transmit a traffic corresponding to a traffic type which is preferred to be transmitted or received by the user equipment via the second communication network.

The second message includes information on a traffic type which is preferred to be transmitted or received by the user equipment via the second communication network supporting the second RAT. In this case, the method may further include the steps of receiving an RRC (radio resource control) connection configuration message, which includes an indicator indicating transmission of a traffic corresponding to the traffic type preferred to be transmitted or received by the user equipment via the second communication network, from the base station of the first communication network. Moreover, the trigger condition is defined according to a traffic type and the trigger condition receiving step may correspond to the step of receiving a trigger condition appropriate for the traffic type indicated by the RRC connection configuration message. In this case, the trigger condition may correspond to user-specific information.

If the trigger condition is satisfied, the second message may include a measurement reporting field by a trigger condition indicating whether to report a measurement result for the second communication network. In this case, if the measurement reporting field by the trigger condition corresponds to a first value and the trigger condition is satisfied, the method further includes the step of reporting the measurement result for the second communication network. If the measurement reporting field by the trigger condition corresponds to a second value, the method further includes the step of reporting the measurement result for the second communication network irrespective of whether the trigger condition is satisfied.

The user equipment may transmit or receive a traffic not corresponding to the traffic type to/from the base station of the first communication network while a traffic corresponding to a traffic type preferred to be transmitted and received via the second communication network is transmitted or received to/from a base station of the second communication network selected by the report at the same time.

To further achieve these and other advantages and in accordance with the purpose of the present invention, according to a different embodiment, a method of supporting signal transmission and reception using two or more radio access technologies (RATs), which is supported by a base station of a first communication network supporting a first RAT, includes the steps of transmitting a first message, which requests information on whether access to a second communication network simultaneously supporting a first communication network and a second RAT is supported, to a user equipment, receiving a second message, which includes an indicator indicating whether simultaneous access to the first communication network and the second communication network is supported, from the user equipment in response to the first message and if the indicator indicates that the user equipment is capable of accessing the first communication network and the second communication network, transmitting a trigger condition to report a measurement result measured for the second communication network.

To further achieve these and other advantages and in accordance with the purpose of the present invention, according to a further different embodiment, a base station of a first communication network supporting a first RAT configured to support signal transmission and reception using two or more radio access technologies (RATs) includes a transmitter, a receiver and a processor, the processor configured to control the transmitter to transmit a first message, which requests information on whether access to a second communication network simultaneously supporting a first communication network and a second RAT is supported, to a user equipment, the processor configured to control the receiver to receive a second message, which includes an indicator indicating whether simultaneous access to the first communication network and the second communication network is supported, from the user equipment in response to the first message, the processor, if the indicator indicates that the user equipment is capable of accessing the first communication network and the second communication network, configured to control the transmitter to transmit a trigger condition to report a measurement result measured for the second communication network.

Advantageous Effects

According to various embodiments of the present invention, a user equipment supporting both a cellular and a WLAN may efficiently perform selection of a heterogeneous network for a flow via a control of a cellular network in a wideband wireless communication system.

According to various embodiments of the present invention, a multi-RAT access method of a non-switching scheme may be provided in a wideband wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

BEST MODE

Mode for Invention

Figure 1:
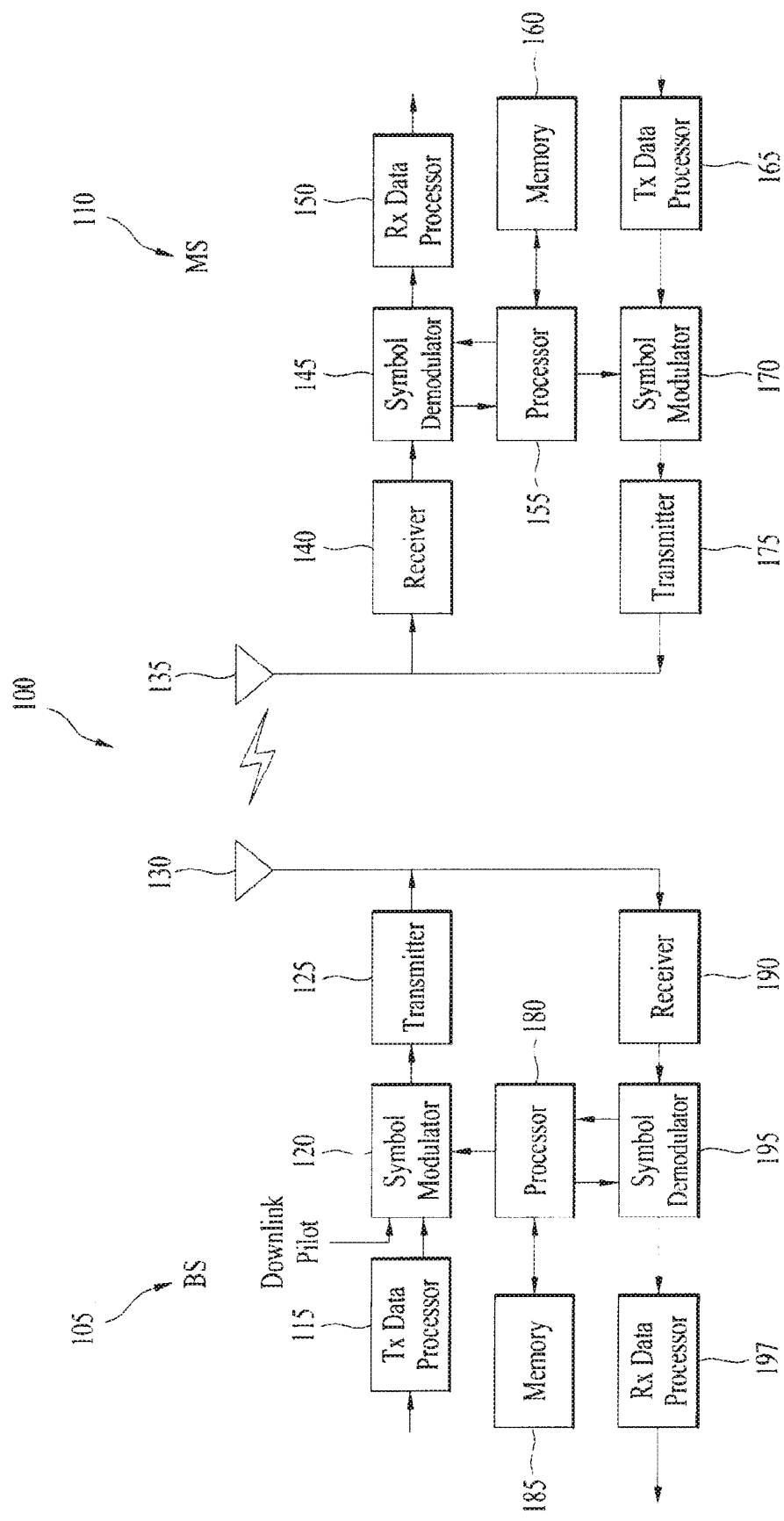
FIG. 1 is a block diagram for configurations of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention may be implemented without these details. For instance, although the following descriptions are made in detail on the assumption that a mobile communication system includes 3GPP LTE/LTE-A system, the following descriptions are applicable to other random mobile communication systems in a manner of excluding unique features of the 3GPP LTE/LTE-A.

Occasionally, to prevent the present invention from getting vaguer, structures and/or devices known to the public are skipped or may be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16 system, contents of the present invention may be applicable to various kinds of other communication systems.

In a mobile communication system, a user equipment is able to receive information in downlink and is able to transmit information in uplink as well. Informations transmitted or received by the user equipment node may include various kinds of data and control informations. In accordance with types and usages of the informations transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA may be implemented by such a radio technology as UTRA (universal terrestrial radio access), CDMA 2000 and the like. TDMA may be implemented with such a radio technology as GSM/GPRS/EDGE (Global System for Mobile communications)/General Packet Radio Service/Enhanced Data Rates for GSM Evolution). OFDMA may be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology may be modified into another form within the scope of the technical idea of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received (Rx) data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received (Rx) data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with one of ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment and an base station may be classified into first layer L1, second layer L2 and third layer L3 based on 3 lower layers of OSI (open system interconnection) model well known to communication systems. A physical layer belongs to the first layer and provides an information transfer service via a physical channel. RRC (radio resource control) layer belongs to the third layer and provides control radio resourced between UE and network. A user equipment and a base station may be able to exchange RRC messages with each other via radio communication layer and RRC layers.

In the present specification, the processor 155 of the user equipment 110 performs operations of processing signals and data except a signal transceiving function of the user equipment 110 and a storing function of the user equipment 110. And, the processor 180 of the base station 105 performs operations of processing signals and data except a signal transceiving function of the user equipment 110 and a storing function of the user equipment 110. Yet, for clarity of the following description, the processors 155 and 180 shall not be mentioned overall. Although the processor 155/180 is not mentioned specially, the processor 155/180 may be regarded as performing a series of operations including data processing and the like except a signal transceiving function and a storing function.

The present invention proposes a method for a user equipment, which supports both a cellular network and a wireless LAN network (e.g., WLAN) in a broadband wireless communication system, to efficiently perform a heterogeneous network selection for a flow through a control of the cellular network.

Figure 2:
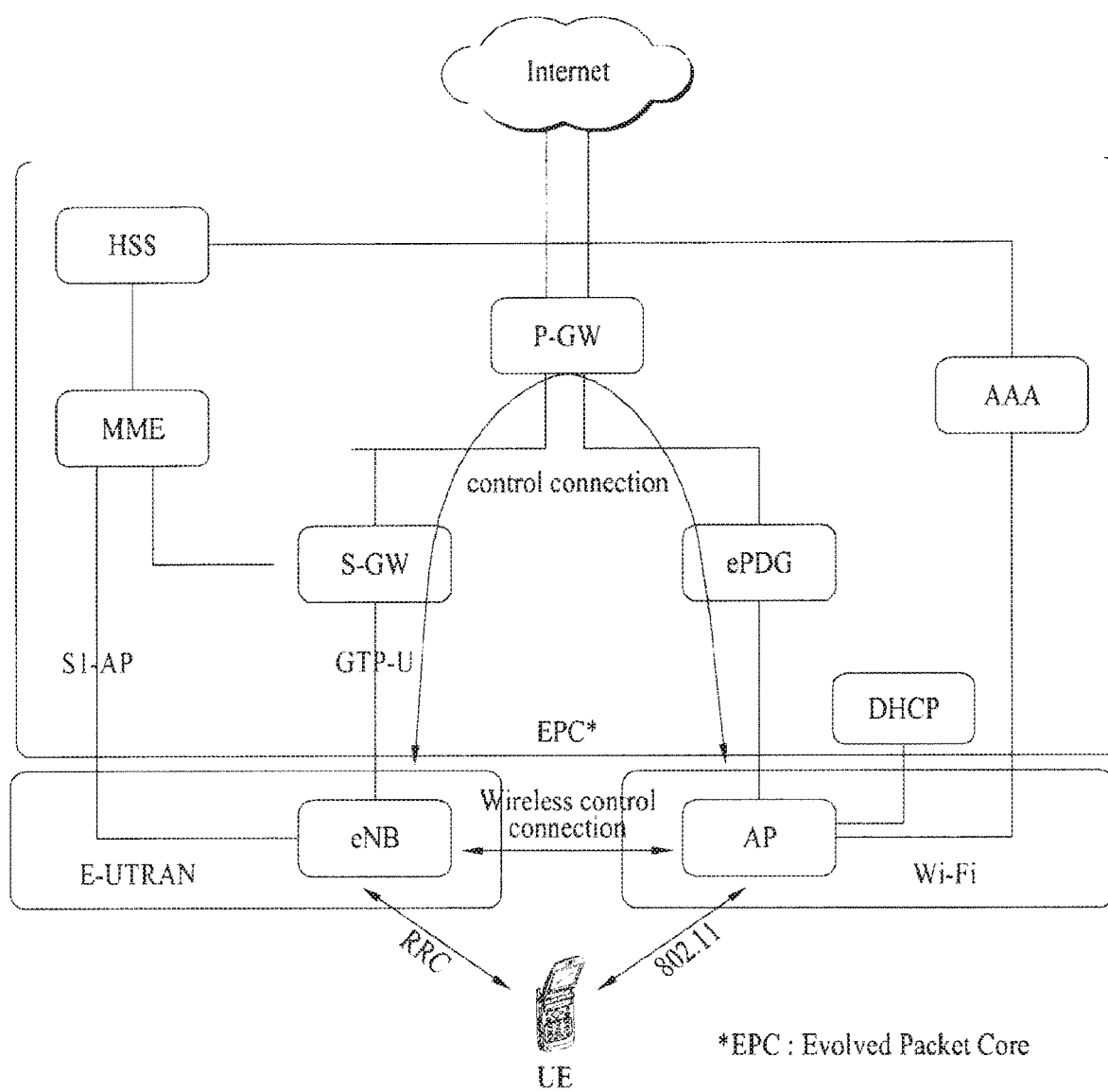
FIG. 2 is a diagram for one example of a network structure to describe an interoperating structure of a first communication system (e.g., LTE system) and a second communication system (e.g., WiFi system)

FIG. 2 is a diagram for one example of a network structure to describe an interoperating structure of a first communication system (e.g., LTE system) and a second communication system (e.g., WiFi system).

In the network structure shown in FIG. 2, a backhaul control connection is established between an AP and an eNB through a backbone network (e.g., P-GW, EPC (evolved packet core), etc.) or a wireless control connection may be established between the AP and the eNB. For peak throughput and data traffic off-loading, a user equipment (hereinafter abbreviated UE) is able to support both a first communication system (or a first communication network) using a first wireless communication scheme and a second communication system (or a second communication network) using a second communication scheme through interoperations among a plurality of communication networks. In this case, the first communication network and the first communication system may be named a primary network and a primary system, respectively. The second communication network and the second communication system may be named a secondary network and a secondary communication system, respectively. For instance, the UE may be configured to simultaneously support LTE (or LTE-A) and WiFi (e.g., a short range communication system such as WLAN, 802.11, etc.). Such a UE may be named a multi-system capability UE in the present specification.

In the network structure shown in FIG. 2, the primary system has a wider coverage and may include a network for control information transmission. For example, the primary system may include one of WiMAX system, LTE system and the like. On the other hand, the secondary system is a network having a smaller coverage and may include a system for data transmission. For example, the secondary network may include a wireless LAN system such as WLAN, WiFi and the like.

Figure 3A:
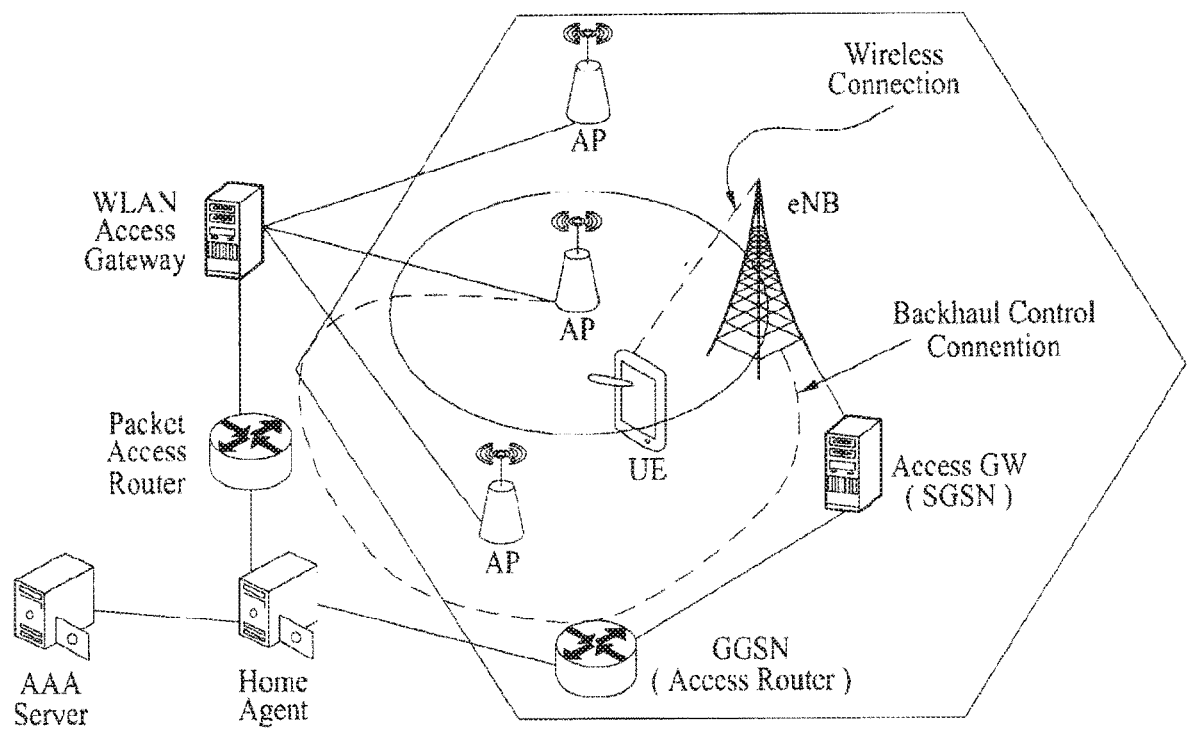
FIG. 3A and FIG. 3B are diagrams for examples to describe scenarios according to the present invention.
Figure 3B:
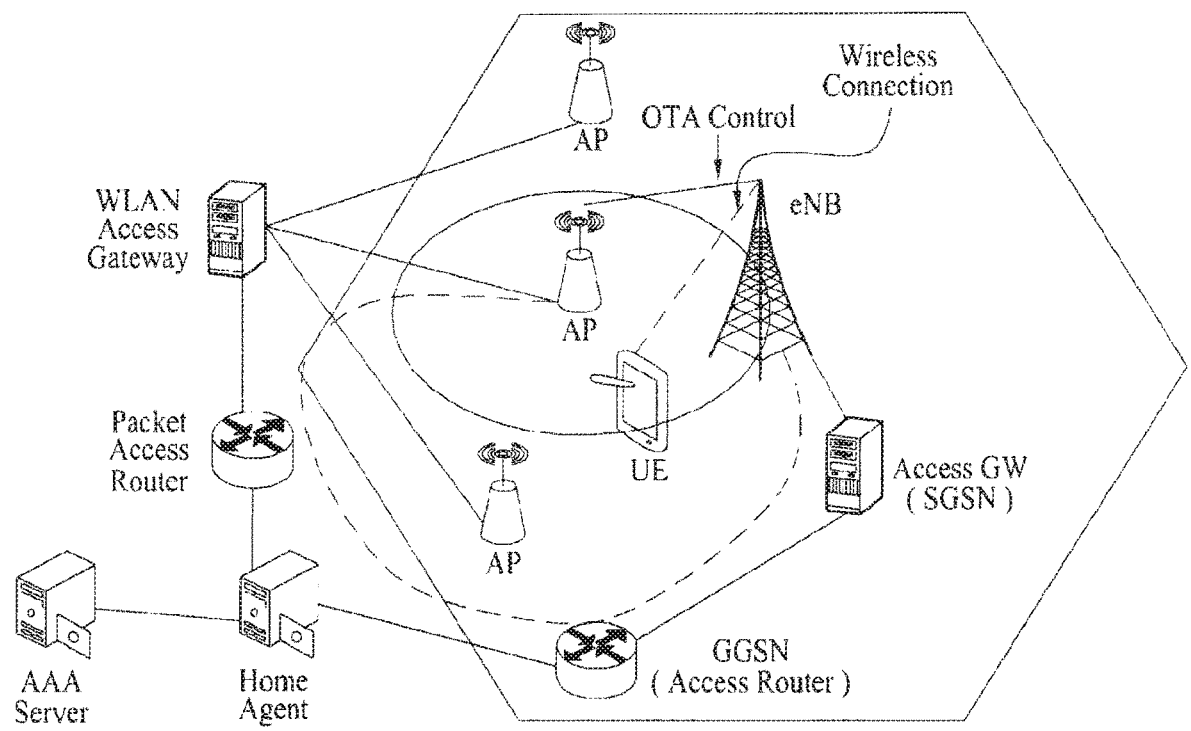

FIG. 3A and FIG. 3B are diagrams for examples to describe scenarios according to the present invention.

FIG. 3A shows a first scenario having a backhaul control connection established between an AP and an eNB (i.e., a base station) via a backbone network. And, FIG. 3B shows a second scenario capable of a direct communication owing to a wireless control connection established between an AP and an eNB. In aspect of the eNB in each of the scenarios, the AP of a secondary system may look like an entity operating in a manner identical to that of a UE having LTE capability.

In the following description, definitions related to a multi-RAT system of the present invention are explained.

Primary System

A primary system (e.g., WiMAX, LTE network, etc.) is a system having a wider coverage. And, the primary system means a network in a connected state in a network having a constant status (or RRC connection) with a multi-system capability UE or a network in a DRX (discontinuous reception) or idle status.

A multi-system capability UE may send an indication, which indicates that the multi-system capability UE has capability for a heterogeneous network (e.g., WLAN, etc.), to an eNB of a primary system during a connection establishment with a primary network. In this case, the indication of the multi-system capability may be transmitted in a manner of being included as a new field in RRCConnectionRequest or RRCConnectionSetup message. If the indication of the multi-system capability is set to 1, a UE and an eNB may share capability necessary for a multi-system through a specific procedure for the multi-system capability UE.

An eNB of a primary system may periodically transmit information on another system (secondary systems) belonging to the same coverage for multi-system UEs using a broadcast message or a unicast message. If deployment of a secondary system is changed, it is able to send an updated message to indicate added/deleted/changed information of the secondary system.

Secondary System

A secondary system is a system having a small coverage and may include one of WLAN system, WiFi system and the like for example. The secondary system is the system that may be added or deleted if necessary. The secondary system may be mainly used for data transmission and reception that requires higher bandwidth (BW). In doing so, a specific flow (QoS) may be mapped.

A connection or release between a secondary system and a UE is possible after confirmation from a primary system.

In this case, the connection between a secondary system and a UE may mean that it is ready to transmit/receive data or that data is transmitted/received.

If it is detected that a UE has entered a secondary system coverage, information on an access to a secondary system may be received through a primary system. In doing so, actual data transmission/reception may not occur instantly.

If a UE has data to transmit/receive via a secondary system, it is able to receive access information on a corresponding flow through a primary system. In doing so, actual data transmission/reception may occur instantly.

Figure 4:
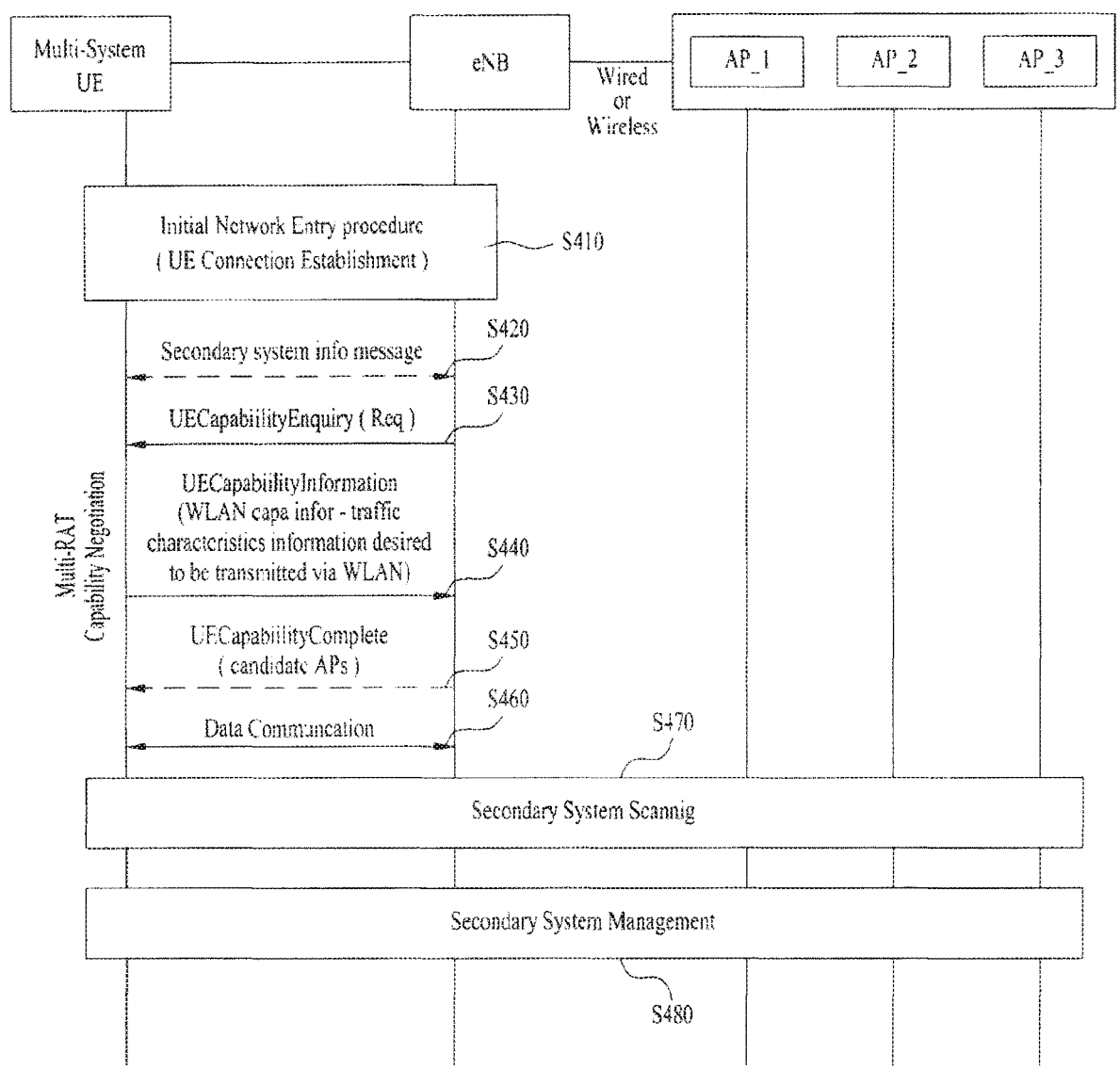
FIG. 4 is a diagram for one example to describe a multi-system capability related negotiation procedure according to the present invention.

FIG. 4 is a diagram for one example to describe a multi-system capability related negotiation procedure according to the present invention.

FIG. 4 is provided for UE capability negotiation on the basis of LTE and shows a process for an eNB, which has capability for a heterogeneous network interoperating technology such as a wireless LAN, to receive a heterogeneous network related information of a UE by sending UECapabilityEnquiry message to the UE.

Referring to FIG. 4, a UE (i.e., a multi-system capability UE) performs an initial network entry procedure with a primary system (i.e., an eNB of the primary system) [S410]. In particular, the UE performs an initial connection establishment with the primary system. In case that the primary system includes an LTE system, the UE performs an initial RRC (radio resource control) connection establishment of the previous LTE. In the initial network entry procedure, the corresponding UE may inform a base station that the corresponding UE is the multi-system or multi-RAT capability UE. For instance, the UE may send the corresponding indication to the base station through RRCConnectionRequest message or in the course of RRCConnectionSetup procedure. In particular, such a parameter (e.g., 1-bit size) as 'MultiRATAccessAvaialble' may be transmitted in a manner of being added to the RRCConnectionRequest message or the RRCConnectionSetup procedure.

If there is a common information, which should be received by the UE, of a base station (hereinafter called an AP (access point)) of a secondary system, a base station (hereinafter called an eNB) of the primary system may transmit an information on the secondary system to the UE [S420].

On the other hand, unlike the description of the step S410 with reference to FIG. 4, the multi-system (or multi-RAT) capability negotiation may be performed after the initial connection establishment.

In case of a connection reestablishment, the multi-system (or multi-RAT) capability negotiation may be skipped. In case of a handover, a target eNB may perform a pre-negotiation through a backbone network from a serving eNB. After the UE has entered RRC-IDLE state, the eNB may store the multi-system capability of the UE for predetermined duration. If a network reconfiguration is performed before multi-system information retain timeout, the negotiation may be omitted.

The eNB may send a message, which queries the capability of the UE (e.g., whether the UE is capable of accessing the multi-system or the multi-RAT simultaneously, whether the UE is capable to simultaneously accessing a prescribed system and a prescribed RAT, etc.), to the UE [S430]. This message may be named 'UECapabilityEnquiry'. As a UE-CapabilityRequest parameter is added to the UECapability-Enquiry message, the UECapabilityEnquiry is sent with a content of the added parameter to query whether the UE is capable of supporting the multi-system or the multi-RAT simultaneously or whether the UE is capable of supporting a prescribed system. In this case, the UE-CapabilityRequest parameter may be transmitted in a manner of including a parameter about such a new radio access technology (RAT) (i.e., an unlicensed band) as WiFi, WLAN, 802.11 and the like.

In response to the UECapabilityEnquiry message, the UE sends a UECapabilityInformation message to the eNB [S440]. This UECapabilityInformation message may contain WiFi related capability information for example.

The UECapabilityInformation message may include an indicator indicating capability of simultaneously accessing a plurality of radio access technologies or system types and information on supportable radio access technologies or system types. For instance, if the supportable ratio access technology includes WiFi, the UECapabilityInformation message may contain 802.11 MAC address (for authentication information) of the UE in addition. The UECapability-Information message may contain a previously accessed AP information (UE's preferred AP). And, the information is preferably transmitted to the eNB to which the previously accessed AP belongs. And, the UECapabilityInformation message may additionally contain Protocol Version (11a/b/n . . . ) information and information on a type or characteristic (e.g., EPS bearer QoS type) of a traffic desired to be transmitted or received via WLAN. This information of the traffic type or characteristic shall be described in detail later.

Thus, as the UE and the eNB exchange the UECapabilityEnquiry message and the UECapabilityInformation message with each other, the following content shown in Table 1 needs to be additionally included in the previous standard specification 3GPP TS 36.331.

TABLE 1

Insert below description to 5.6.3.3 Reception of the UE Capability Enquiry by the UE (3GPP TS 36.331)
The UE shall:
1> set the contents of UECapability Information message as follows:
2>if the ue-CapabilityRequest includes wifi and if the UE supports WiFi (or WLAN or 802.11x) domain:
3>include the UE radio access capabilities for WiFi within a ue-CapabilityRAT-Container and with the rat-Type set to WiFi(or WLAN or 802.11x);
1> submit the UECapabilityInformation message to lower layers for transmission, upon which the procedure ends Having received the supportable radio access technology or system type information through the UECapabilityInformation message, the eNB sends UECapabilityComplete or UECapabilityResponse message [S450]. In this case, the UECapabilityComplete or UECapabilityResponse message may contain candidate APs information.

In the case shown in FIG. 4, only if a previous UECapabilityEnquiry message is sent (1 step), the UE sends the UECapabilityInformation message (2 step). In this case, the eNB may send the UECapabilityComplete message in response to the UECapabilityInformation message (3 step), which is an optional step. Hence, the MultiRAT capability negotiation procedure may include 2 or 3 steps.

Alternatively, the MultiRAT capability negotiation procedure may be configured to include 1 or 2 steps. In particular, without a previous UECapabilityEnquiry message, the UECapabilityInformation may be sent to the eNB in an unsolicited manner under the decision made by the UE (1 step). In this case, the eNB may send UECapabilityComplete message to the UE in response to the UECapability-Information message (optional) (2 steps).

After the step S450, the UE may exchange data with the eNB [S460]. Based on the candidate AP list (or APs)

received in the step S450, the UE may select the AP by performing a secondary system scanning [S470]. After the scanning, the UE may perform a secondary system management [S480]. In this case, there is a trigger condition for a secondary system (e.g., AP) measurement. Prior to describing the definition of the trigger condition, QoS (quality of service) indicating a traffic state is schematically described with reference to 3GPP LTE system for example.

Figure 5:
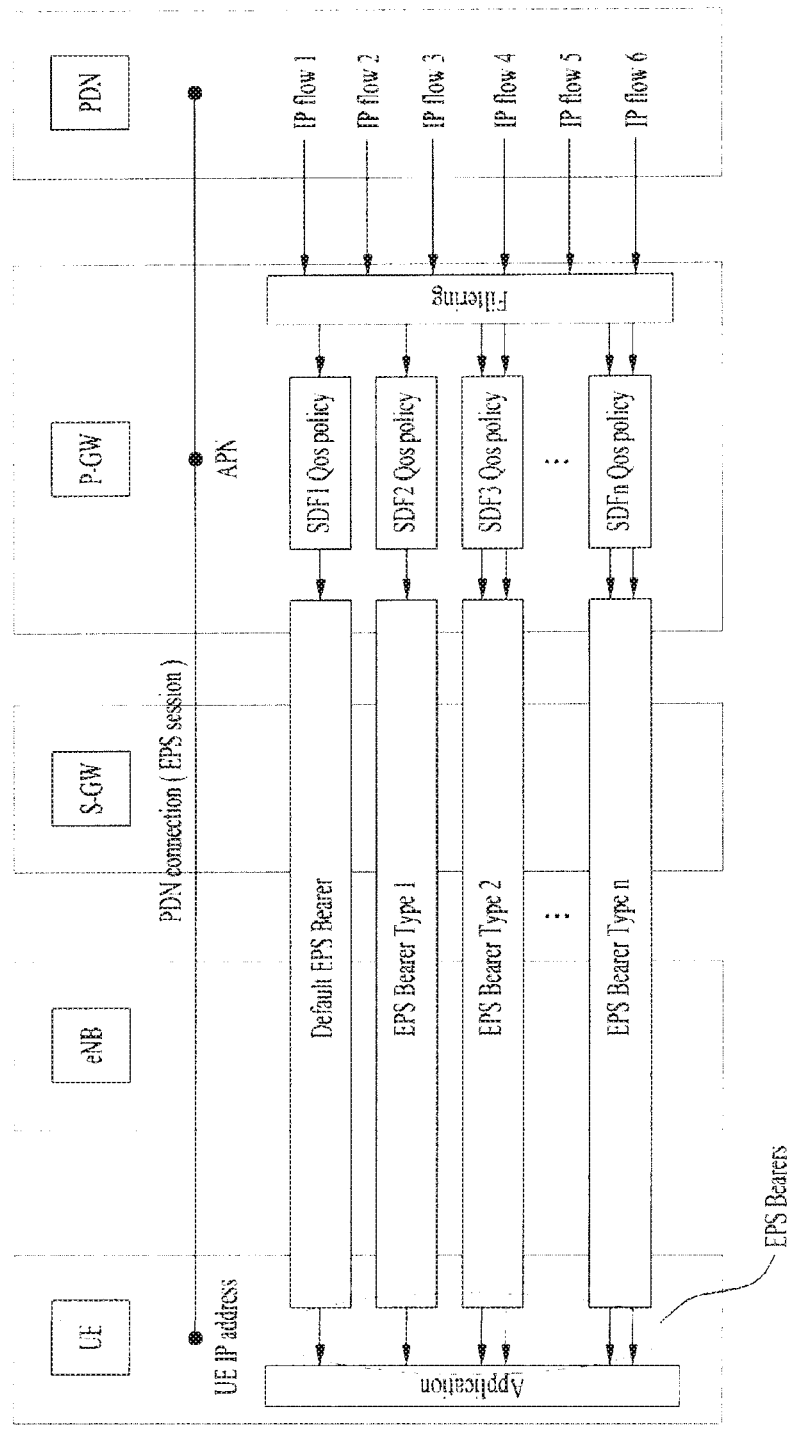
FIG. 5 is a diagram for one example to describe traffic characteristics in LTE system.

FIG. 5 is a diagram for one example to describe traffic characteristics in LTE system.

Referring to FIG. 5, if a UE accesses an LTE network, EPS (evolved packet system) Bearer is generated from the UE to P-GW (i.e., UE-eNB-S-GW-P-GW) [GTP type tunnel]. In particular, a plurality of EPS Bearers may be generated depending on each service property. For instance, Internet EPS Bearer, IPTV EPS Bearer, VoIP EPS Bearer and the like may be generated. Properties of Default EPS Bearer and Dedicated EPS Bearer are described as follows.

Default EPS Bearer—QoS property of Default EPS Bearer includes Non-GBR (Non-Guaranteed Bit Rate), e.g., Internet service.

Dedicated EPS Bearer—Dedicated EPS Bearer may be generated at GBR or Non-GBR. For instance, Dedicated EPS Bearer for VoD service is generated at GBR.

LTE QoS is described in brief as follows.

First of all, a previous LTE enables traffic characteristics to be defined on a network level (i.e., P-GW). In particular, the P-GW defines 5-tuple Service Data Flow and an eNB defines GBR or Non-GBR.

PDN connection: IP connection between UE and PDN (UE is identified with IP address, while PDN is identified with APN).

EPS session: Having the same meaning of PDN connection. This session has at least one EPS bearer. If IP address is assigned to a UE, this session is maintained as long as the UE is connected to an IP network.

EPS bearer: A delivery path established between UE and P-GW to transmit IP traffic with specific QoS. Each EPS bearer is configured with QoS parameters indicating property of the delivery path.

Default bearer: This is EPS bearer newly generated when a new PDN connection is established. This bearer is maintained until the PDN connection is terminated. This bearer is always configured at non-GBR.

Dedicated Bearer: This is EPS bearer generated on demand additionally after PDN connection establishment. Corresponding to GBR or non-GBR.

SDF (Service Data Flow): IP flow corresponding to a service or a set of IP flows. This flow is identified by an IP of packet and TCP/UDP header. A different QoS is applied per SDF and PCC rules are applied by PCRF. This flow is delivered on EPS bearer that meets QoS of SDF. Several SDFs may be mapped to the same EPS bearer. User traffic has a different QoS property depending on using what kind of service or application. SDF is an IP flow generated from filtering user traffic per service or a set of IP flows. And, a specific QoS policy is applied in accordance with a subscriber level of UE and a used service. IP flows toward a user are sorted into SDF through SDF template (classifier) in accordance with service property and are then delivered to a user in a manner of having QoS policy (e.g., bandwidth control) applied thereto per SDF. On EPS delivery network, QoS is transmitted in a manner of being mapped to EPS bearer.

EPS bearer: As mentioned in the foregoing description, EPS bearers may be sorted into a default type and a dedicated type. If a UE accesses an LTE network, an IP address is assigned to the UE. Then, the UE establishes a PCN connection as soon as EPS bearer is generated. While the UE uses a service (e.g., Internet) through default bearer, if the UE uses another service (e.g., VoD) that cannot be provided through the default bearer, dedicated bearer is generated by on-demand. In particular, the dedicated bearer is configured by QoS different from that of a previously configured bearer. UE may access several APNs. And, one default EPS bearer and sever dedicated EPS bearers may be configured per APN. Maximum 11 EPS bearers may be configured.

Default bearer is generated when a UE initially accesses a network. The default bearer keeps being maintained even if a service is not used in the meantime. The default bearer then disappears when the UE leaves the network. One default bearer is generated per PAN. How to generate a default bearer by applying which QoS to a prescribed APN in case of an initial access to a network is provisioned as a user's subscription information in HSS. If a UE initially accesses a network, an MME downloads user's subscription information from an HSS and then generates default bearer with a corresponding PDN using subscriber QoS profile.

SDF QoS: QCI (QoS Class Identifier) and ARP (Allocation and Retention Priority) are basic parameters applied to all SDFs. QCI is an expression with integer values (1 to 9) by standardizing different QoS properties. And, the standardized QoS properties may be represented as resource type, priority, packet delay budget, packet error loss rate and the like. The SDF may be categorized into a GBR type SDF having a network resource allocated fixedly or a non-GBR type SDF having a network resource not allocated fixedly in accordance with a resource type. Besides QCI and ARP, GBR (Guaranteed Bit Rate) and MBR (Maximum Bit Rate) are assigned as QoS parameters to the GBR type SDF and MBR is assigned to the non-GBR type SDF.

GBR type SDF QoS parameter: QCI, ARP, GBR (DL/UL), MBR (DL/UL)

Non-GBR type SDF QoS parameter: QCI, ARP, MBR (DL/UL)

SDF is mapped to EPS bearer by P-GW and is then delivered to UE through the EPS bearer. SDFs (SDF aggregate) having the same QCI and ARP are mapped to one EPX bearer.

EPS Bearer QoS: QCI and ARP are basic QoS parameters applied to all EPS bearers. EPS bearer is categorized into GBR type bearer or non-GBR type bearer in accordance with QCI resource type. A default bearer is always non-GBR type and a dedicated bearer may be set to GBR or non-GBR. GBR type bearer QoS parameters may include QCI, ARP, GBR (DL/UL), and MBR (DL/UL). Non-GBR type bearer QoS parameters may include QCI, ARP, APN-AMBR (DL/UL), and UE-AMBR (DL/UL).

Besides QCI and ARP, the GBR type bearer has GBR and MBR as QoS parameters, which means that a fixed resource is allocated per bearer. On the other hand, the non-GBR type bearer has AMBR (Aggregated Maximum Bit Rate) as QoS parameter, which means that a maximum bandwidth usable together with other non-GBR type bearers is assigned instead of receiving resource application per bearer. APN-AMBR is a maximum bandwidth that may be shared within the same PDN by non-GBR type bearers and UE-AMBR is a maximum bandwidth sharable within the same UE. In case that UE has several PDN connections, a sum of APN-AMBRs of the PDNs cannot exceed UE-AMBR.

In the following description, definition of a trigger condition for a secondary system (e.g., AP) measurement is explained. In particular, a trigger condition for a UE to initiate other RAT measurement is described.

(1) A condition for a UE to start a measurement of neighbor AP in a step of not starting a measurement may be determined by a traffic transmitted on radio resource configuration (e.g., DRB (Data Radio Bearer) addition). The condition may be determined in accordance with GBR, non-GBR or a new EPS bearer QoS type defined by the present invention. If a traffic desired to be transmitted via AP in case of Multi-RAT Capability Negotiation (S410, or S420 to S450) is defined and is generated through radio resource configuration, the UE may start the AP measurement.

(2) If IEEE 802.11 (WLAN, AP) is selected as a preferred system in radio resource configuration, a UE may start a measurement of neighbor AP.

Meanwhile, a metric for starting a measurement may be transmitted as a UE-specific value to a UE by an eNB through a unicast message. In the following description, a traffic type used to determine a trigger condition for a secondary system (e.g., AP) measurement is explained.

Traffic Characteristics in LTE

As traffics transmitted on a cellular network are diversified, if an eNB is aware of traffic characteristics and processes radio bearers appropriately, it may help enhancement of total system performance. Yet, a current LTE system discriminates a service data flow (SDF) on APN (p-GW) level only in accordance with a specific QoS policy, defines a QoS level, and then provides a service appropriate for it.

P-GW SDF-QoS-defines a service data flow sorted by 5-tuple (Source IP, Destination IP, Source Port number, Destination Port number, Protocol ID) in accordance with a QoS policy. The SDF QoS is mapped again to EPS bearer QoS. Currently, there are two types (default, dedicated) of EPS bearers in LTE.

Referring to FIG. 5, an eNB or LTE system defines LTE EPS bearer on a sub-divided QoS level using the corresponding SDF QoS definition and the eNB may provide a different service for each of the types. To this end, like SDF QoS, EPS bearers may be sorted by the following types (EPS bearer QoS types).

Ex.) voice (Conversational Real Time service), streaming video (streaming real time service), web browsing (Interactive BE service), telemetry/emails (Background BE service)

EPS Bearer type 1: This type corresponds to a default EPS bearer that is basically generated when a connection is established.

EPS Bearer type 2: Best Effort Service type

EPS Bearer type 3: Real time service

. . .

EPS Bearer type n: Streaming video service

Figure 6:
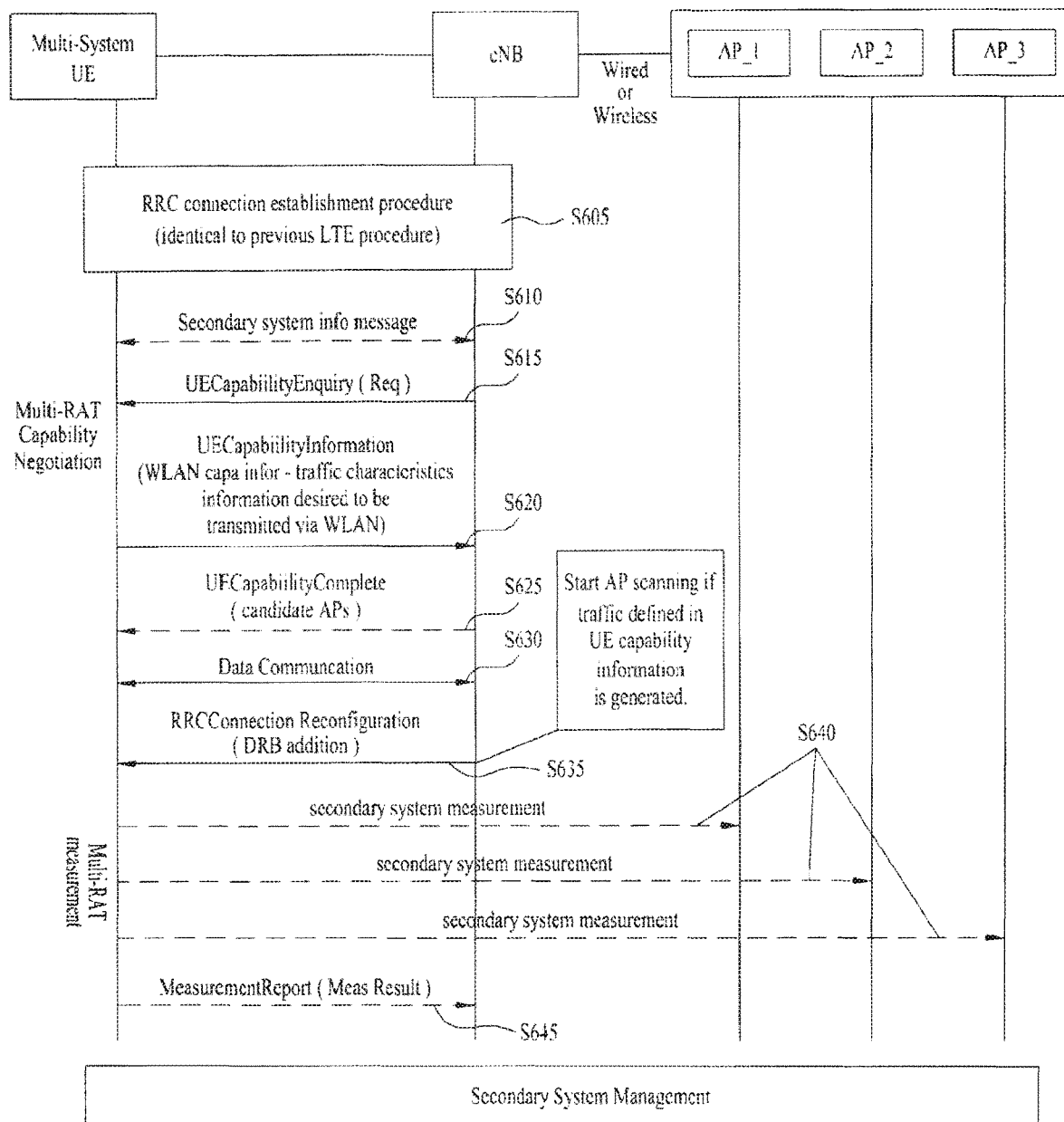
FIG. 6 is a diagram to describe a system selecting method using QoS class defined in LTE.

FIG. 6 is a diagram to describe a system selecting method using QoS class defined in LTE.

Referring to FIG. 6, steps S605 to S630 sequentially correspond to the former steps S410 to S460 shown in FIG. 4, respectively. And, the contents of the S410 to S460 described with reference to FIG. 4 may be applied to the steps S605 to S630.

Subsequently, a UE may receive an RRC connection reconfiguration message (e.g., RRCConnectionReconfiguration message) from an eNB [S635]. A data radio bearer (DRB) may be transmitted in a manner of being added to the RRC connection reconfiguration message. As mentioned in the foregoing description of the trigger condition (1) for the UE to initiate measurement of a different radio access technology, whether to trigger a measurement of neighbor AP may be determined by a traffic type transmitted through the radio resource configuration (e.g., DRB addition). And, the trigger condition may be determined in accordance with GBR, Non-GBR, or a new EPS bearer QoS type (or traffic type) defined by a technology of the invention.

Thus, if a type of a traffic transmitted by being included in the RRCConnectionReconfiguration message corresponds to a traffic type that meets the trigger condition, the UE may perform a measurement on a base station (e.g., neighbor APs (AP1, AP2, AP3) shown in FIG. 6) that uses a different radio access technology [S640]. Thereafter, the UE reports a result of the measurement to the eNB [S645].

System Selecting Method Using QoS Class Defined in LTE

The technology of the present invention enables an eNB (or such a network entity as MultiRAT Management entity) to select a system appropriate for a traffic using EPS bearer type defined in the foregoing description. It may be difficult to select an appropriate system using the previous classification reference (i.e., GBR, non-GBR) for data flow. The technology of the present invention may determine an eNB to transmit a specific traffic type (or specific flow(s)) to a network (e.g., WLAN, i.e., a secondary system), which uses a radio access technology different from that of an LTE network in accordance with information received from a UE using the EPS bearer type defined in the foregoing description. To this end, the eNB delivers the traffic, which was transmitted in the step S620 and corresponds to a traffic type desired to be received via WLAN, to the AP. Subsequently, the UE receives the traffic, which corresponds to the traffic type desired to be received via the WLAN, from the AP and is also able to receive a traffic corresponding to another traffic type via LTE network at the same time.

If a network entity or eNB below S-GW manages flows of a multi-RAT UE, an RAT selection for a traffic (or flow) of the UE is performed in a following manner. First of all, an eNB receives information on a network (e.g., a secondary system), which uses a different radio access technology, from the UE. Secondly, the eNB analyzes the received information in a manner of comparing it to information on a serving cell (i.e., a cell in a currently connected primary system). Finally, the eNB selects an RAT for maximizing overall system performance. According to the present invention, the eNB is assumed as becoming a subject for the selection.

If a network entity above P-GW is capable of managing RAT of a UE, the corresponding network entity should be able to receive state information of the UE and state information of a heterogeneous network such as a cellular network, WLAN and the like. When traffic characteristics desired to be transmitted via wireless LAN (i.e., an access capable RAT in accordance with capability of UE) are shared between a UE and an eNB in case of multi-RAT capability negotiation, if a specific traffic is generated and corresponds to a traffic preferred to be transmitted via the wireless LAN (i.e., secondary system), the eNB controls a state of the wireless LAN (i.e., secondary system) to be searched using the above information.

Measurement Report

A data connection transmitted from an eNB to a UE is established by an RRC (radio resource configuration) procedure. Assuming that data for a specific RB (radio bearer) or LC (logical channel) is transmitted via a secondary system (e.g., AP) under the determination made by the eNB, if it is determined that the specific RB or LC needs to communicate with the secondary system (e.g., AP), the eNB may instruct the UE to scan neighbor APs.

In doing so, the eNB sends an RRCConnectionReconfiguration message to the UE, whereby the UE may initiate a measurement. In particular, the UE may initiate the measurement of AP by an active scanning (e.g., Probe Request transmission and Probe Response reception) or a passive scanning (e.g., Beacon reception).

In the RRCConnectionReconfiguration message, at least one of Measurement Configuration and Radio Resource Configuration may be included. The Measurement Configuration may include information for a UE to find a secondary system quickly. For instance, the Measurement Configuration may include at least one of SSID of AP neighbor to the UE, a beacon transmission cycle, and a measurement gap information. The Radio Resource Configuration may carry a field for indicating traffic characteristics of a generated RB. For instance, in the Radio Resource Configuration, such a parameter value indicating traffic characteristics as EPS bearer QoS type, QCI, ARP GBR (DL/UL), MBR (DL/UL) and the like may be included.

If a trigger condition for a secondary system measure is already defined, the UE may initiate the measurement of AP on the condition that the trigger condition is met irrespective of a presence or non-presence of the reception of the RRCConnectionReconfiguration message from the eNB.

It may be unnecessary for the Measurement Configuration of the RRCConnectionReconfiguration message, which is mentioned in the above description, to include the information on the measurement gap all the time. In some cases, the information on the measurement gap may be omitted from the Measurement Configuration. This is described in detail with reference to FIG. 7 as follows.

Figure 7:
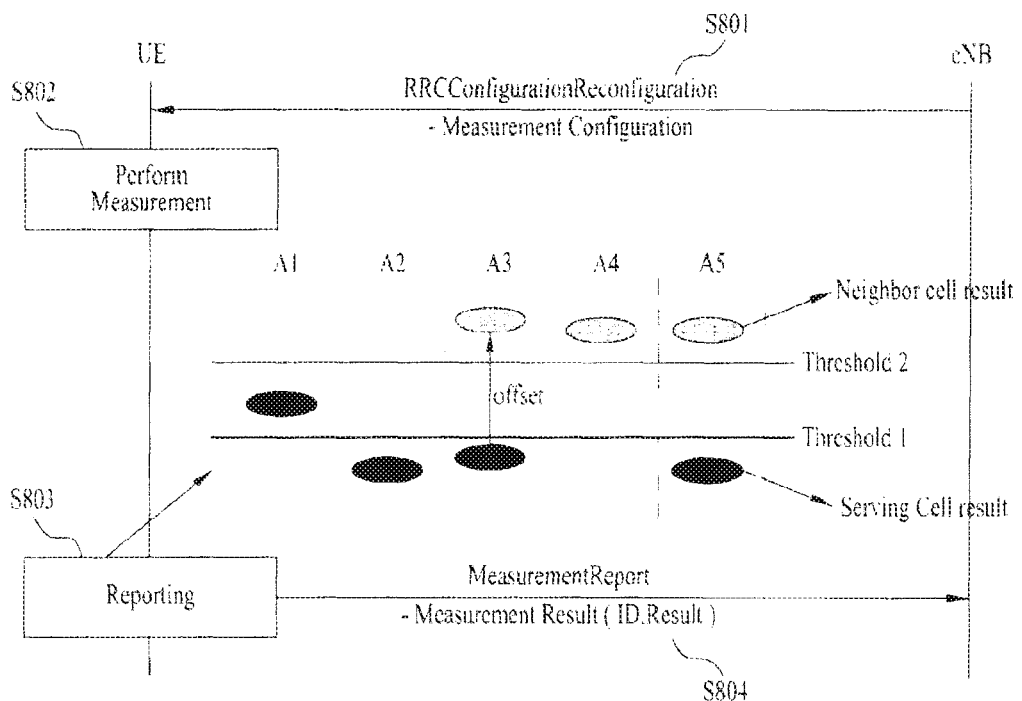
FIG. 7 is a diagram for one example to describe a measurement gap in LTE system.

FIG. 7 is a diagram for one example to describe a measurement gap in LTE system. A UE may use InterFreqRSTDMeasurementIndication message to instruct a network to start or stop a measurement of RSTD (Reference Signal Time Difference) between OTDOA (Observed Time Difference Of Arrival) frequency bands requiring a measurement gap.

If it is indicated that an upper layer starts the inter-frequency band RSTD measurement only, the UE is able to confirm a measurement gap required situation as soon as receive the indication from the upper layer. If a sufficient gap is available at this timing point, the UE may skip the transmission of the InterFreqRSTDMeasurementIndication message. Thereafter, even if the measurement gap gets insufficient, the UE may skip the transmission of the InterFreqRSTDMeasurementIndication message unless receiving a new indication from the upper layer.

If the upper layer indicates to stop performing the inter-frequency band RSTD measurement, the UE may send the InterFreqRSTDMeasurementIndication message despite having skipped the transmission of the InterFreqRSTDMeasurementIndication message in response to the previous indication indicating to start the inter-frequency band RSTD measurement.

Thus, it is necessary for a sufficient measurement gap to be configured for an inter-frequency band RSTD measurement in a switching based multi-RAT access system. Yet, the present invention relates to a non-switching based multi-RAT access system. According to the present invention, since a UE may access a secondary system without transferring a primary system, a measurement of the secondary system may be possible without configuring a measurement gap. Therefore, information on the measurement gap may be omitted from Measurement configuration of RRCConnectionReconfiguration.

The UE may set a given DRB as a single measurement object as well as a given frequency. In this case, the UE may explicitly indicate the measurement object in accordance with a radio access technology type (e.g., E-UTRAN, UTRAN, CDMA2000, GERAN, WLAN, etc.). In this case, a third layer may filter a measurement result on a first layer. As mentioned in the foregoing description, the inter-frequency band measurement may be performed in an idle interval including the measurement gap. Yet, a measurement of wInter-RAT (i.e., secondary system) may be performed without a measurement gap.

Generally, in order to maintain an optimal access to a base station, a UE should perform a measurement on at least one of a serving base station and a neighbor base station to switch from a specific RAT to another RAT. The UE measures the serving base station and the base station in response to an indication of an eNB and is able to report a result of the measurement to the eNB.

Yet, if the result of the measurement of the at least one of the serving base station and the neighbor base station is insignificant, the measurement result may not be transmitted to the eNB. For instance, if a signal of the neighbor base station is considerably lower than that of the serving base station, it is able to raise system efficiency by not reporting the measurement result. Hence, only if a trigger condition of the measurement result is met, the UE may transmit the measurement result for the at least one of the serving base station and the neighbor base station to the eNB.

Figure 8:
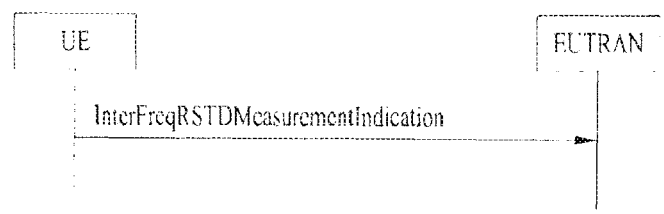
FIG. 8 is a flowchart of a process for a UE to report a measurement result to an eNB.

For instance, FIG. 8 is a flowchart of a process for a UE to report a measurement result to an eNB. Referring to FIG. 8, a UE receives RRC Configuration Reconfiguration message from an eNB [S801]. The UE performs a measurement [S802]. And, the UE may report a measurement result to the eNB using Measurement Report message [S804]. In doing so, the UE determines whether the following trigger condition is met [S803]. Only if the trigger condition is met, the UE may report a result of the measurement of at least one of a neighbor base station and a serving base station to the eNB.

A1: Serving base station gets better than a first threshold (threshold 1).

A2: Serving base station gets worse than the first threshold.

A3: Neighbor base station gets better then PCell (primary cell) by offset.

A4: Neighbor base station gets better than a second threshold (threshold 2).

A5: PCell gets worse than the first threshold and the neighbor base station gets better than the second threshold.

A6 (not shown in the drawing): Neighbor base station gets better than SCell (secondary cell) by offset (in CA (Carrier Aggregation) environment).

According to the present invention, a UE is not switched from a specific RAT to another RAT. Instead, while the UE maintains an access to a specific RAT (e.g., primary system), the present invention enables an access to another RAT (e.g., secondary system). Hence, measurement objects and reporting trigger conditions different from the above-enumerated A1 to A5 are applicable.

Figure 9:
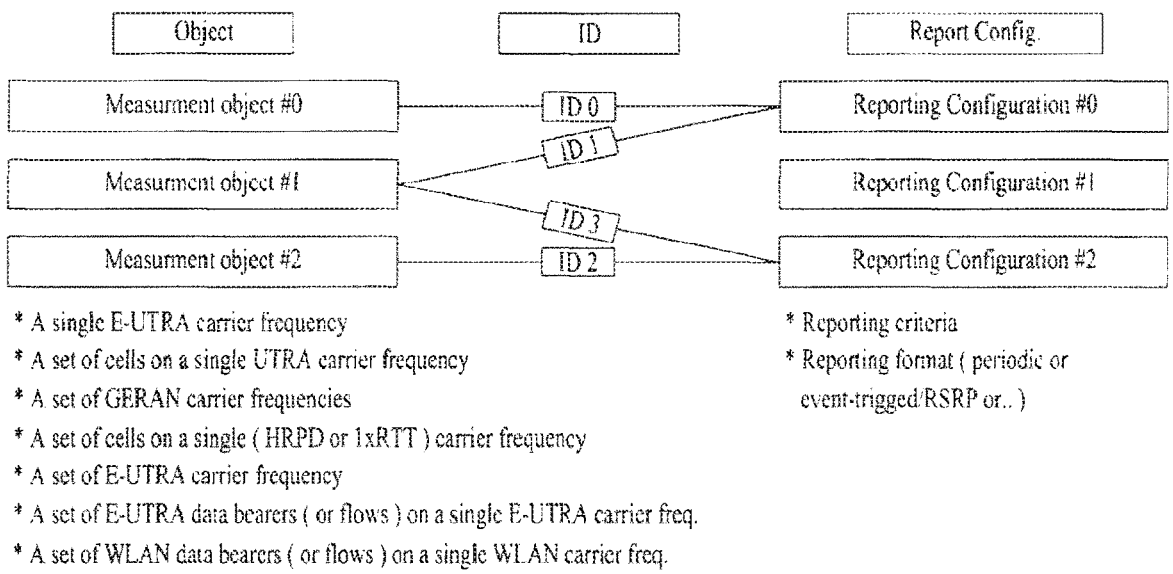
FIG. 9 is a diagram for one example to describe a measurement object and a report configuration for a measurement result.

FIG. 9 is a diagram for one example to describe a measurement object and a report configuration for a measurement result. Referring to FIG. 9, a UE may set a frequency or DRB given per radio access technology as a measurement object. For instance, in a switching based multi-RAT access environment, a specific frequency (or cell) is a measurement object like a single E-UTRA carrier frequency, a set of cells on a single UTRA carrier frequency, a set of cells GERAN carrier frequencies, a set of cells on a single (HRPD or 1×RTT) carrier frequency and the like. On the other hand, in a non-switching based multi-RAT access environment like the present invention, a frequency may be set as a measurement object like a set of WLAN carrier frequencies or a DRB may be set as a measurement object like a set of E-UTRA data barriers (or flows) on a single E-UTRA carrier frequency, a set of WLAN data bearers (or flows) on a single WLAN carrier frequency and the like.

The UE gives a measurement ID for identifying a result of measurement of result of a measurement object and is then able to report the measurement ID given measurement result to the eNB. The measurement result reporting may occur periodically. Alternatively, the measurement result reporting may occur if a trigger condition for the reporting is met.

In the non-switching based multi-RAT access environment, a UE may report a measurement result of a secondary system if the following trigger condition occurs.

B1: Case that an inter-RAT neighbor gest better than a second threshold.

B2: Case that PCell gets worse than a first threshold and an inter-RAT neighbor gets better than the second threshold.

B3: Case that an inter-RAT serving gets worse than the first threshold.

In the above enumerated conditions B1 to B3, the inter-RAT may mean a base station (e.g., AP) of a secondary system. When a serving base station of a UE is a base station (e.g., eNB) of a primary system, the inter-RAT serving neighbor may mean that a serving base station of the UE is a base station (e.g., AP) of a secondary system.

Figure 10:
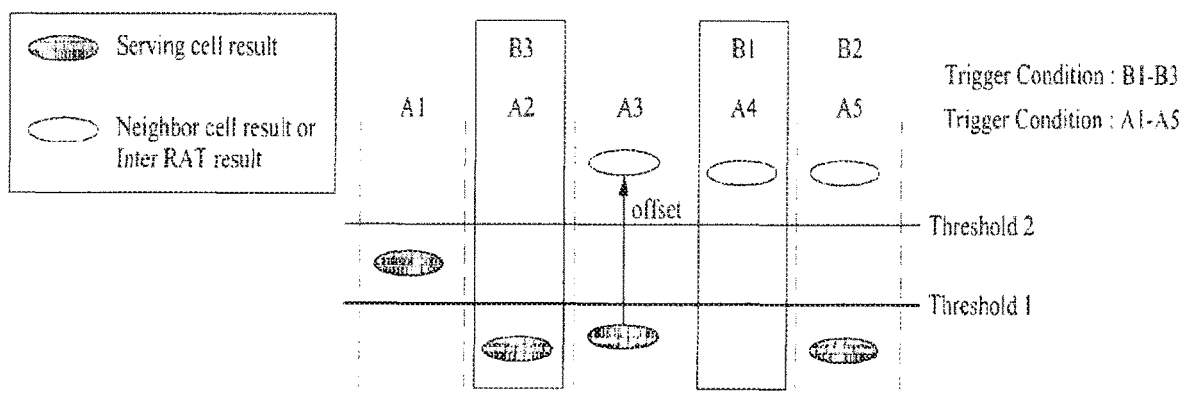
FIG. 10 is a diagram of enumerated trigger conditions.

FIG. 10 is a diagram of enumerated trigger conditions. A1 to A10 diagrammatize the trigger conditions in a switching based multi-RAT access environment. And, B1 to B3 diagrammatize the trigger conditions in a non-switching based multi-RAT access environment. In this case, a first threshold may be provided to determine whether a measurement result of a primary system (or a serving base station) is meaningful. And, a second threshold may be provided to determine whether a measurement result of a secondary system (or a neighbor base station) is meaningful.

A parameter value for a trigger condition for reporting may be transmitted to a UE via a reportConfigInterRAT message. In particular, the reportConfigInterRAT message may be broadcasted or unicasted to a UE. When a measurement object is a DRB, the reportConfigInterRAT may be transmitted as UE-specific information to the UE by unicast.

The trigger conditions may be set to different values for each measurement object. For instance, each of the first and second thresholds may be defined as a different value depending on preference of AP or traffic characteristics of DRB.

For instance, a voice traffic may prefer to communicate via a primary system (e.g., a cellular network) rather than a secondary system (e.g., WLAN network). And, a data traffic may prefer to communicate via a secondary system rather than a primary system. Hence, a threshold value (e.g., second threshold) for reporting a measurement result of the secondary system may be set high for the voice traffic. And, a threshold value (e.g., a second threshold) for reporting a measurement result of the secondary system may be set low for the data traffic. Thus, as the threshold values for reporting the measurement result may vary depending on a transmitted traffic, trigger conditions may be defined and transmitted in accordance with the traffic characteristics. As mentioned in the above description, the trigger condition may be defined differently in accordance with a traffic type (e.g., EPS bearer QoS type) of flow or traffic characteristics (e.g., GBR, non-GBR, etc.) of flow.

An eNB may provide a UE with a trigger condition for a reporting through RRCConnectionReconfiguration message. In particular, the eNB may provide the UE with the trigger condition through measConfig./radioResourceConfg of RRCConnectionReconfiguration. In case that the trigger conditions is defined in accordance with a traffic type or traffic characteristics of flow, the trigger condition for each flow (or RB) may be transmitted to the UE. In doing so, the eNB may transmit an appropriate trigger condition to the UE by unicast with reference to characteristics of a traffic transmitted through radio resource configuration.

Based on the trigger condition for the reporting, whether to report a measurement result may be determined or set in case of multi-RAT capability negotiation between the UE and the eNB.

For instance, although a signal strength of AP is lower than a threshold (e.g., second threshold) determined by the trigger condition, if a user intends to communicate using the AP, it may be necessary to report a measurement result of the AP irrespective of whether the trigger condition is met.

Hence, the UE may indicate whether the measurement result will be reported by the trigger condition in case of the multi-RAT capability negotiation. In particular, the UE may use 'measurement reporting by trigger condition' bit of UECapabilityInformation message to indicate whether the measurement result of the AP will be reported by the trigger condition. For instance, when a value of the 'measurement reporting by trigger condition' bit is set to 1, the measurement result of the AP is reported only if the trigger condition for the reporting is met. When a value of the 'measurement reporting by trigger condition' bit is set to 1, despite that the trigger condition for the reporting is not met, if the AP is detected, the UE may report the measurement result of the AP. In doing so, the UE may report a measurement result of a preferred AP among the detected APs only to the eNB.

The UE may report the measurement result of the detected AP to the eNB. In this case, the measurement result of the AP may include at least one of a channel state information (e.g., RSSI (Received Signal Strength Indicator), RCPI (Received Channel Power Indicator), RSNI (Received Signal to Noise Indicator), etc.) and a preferred AP information.

For instance, Table 2 shows one example of a measurement result report message (Measurement Report message) sent to an eNB by a UE.

TABLE 2

1> set the measId to the measurement identity that triggered the measurement reporting;

1> set the measResultPCell to include the quantities of the PCell;

1> set the measResultServFreqList to include for each SCell that is configured, if any, within measResultSCell the quantities of the concerned SCell;

1> if the reportConfig associated with the measId that triggered the measurement reporting includes reportAddNeighMeas:

TABLE 2-continued

2> for each serving frequency for which measObjectId is referenced in the measIdList, other than the frequency corresponding with the measId that triggered the measurement reporting:
            3> set the measResultServFreqList to include within measResultBestNeighCell the physCellId and the quantities of the best non-serving cell, based on RSRP, on the concerned serving frequency;
    1> if there is at least one applicable neighbouring cell to report:
        2> set the measResultNeighCells to include the best neighbouring cells up to maxReportCells in accordance with the following:
            3> if the triggerType is set to event:
                4> include the cells included in the cellsTriggeredList as defined within the VarMeasReportList for this measId;
            3> else:
                4> include the applicable cells for which the new measurement results became available since the last periodical reporting or since the measurement was initiated or reset;
            3> for each cell that is included in the measResultNeighCells, include the physCellId;
            3> if the triggerType is set to event; or the purpose is set to reportStrongestCells or to reportStrongestCellsForSON:
                4> for each included cell, include the layer 3 filtered measured results in accordance with the reportConfig for this measId, ordered as follows:
                    5> if the measObject associated with this measId concerns E-UTRA:
                        6> set the measResult to include the quantity(ies) indicated in the reportQuantity within the concerned reportConfig in order of decreasing triggerQuantity, i.e. the best cell is included first;
                    5> if the measObject associated with this measId concerns UTRA FDD and if ReportConfigInterRAT includes the reportQuantityUTRA-FDD:
                        6> set the measResult to include the quantities indicated by the reportQuantityUTRA-FDD in order of decreasing measQuantityUTRA-FDD within the quantityConfig, i.e. the best cell is included first;
                    5> if the measObject associated with this measId concerns UTRA FDD and if ReportConfigInterRAT does not include the reportQuantityUTRA-FDD; or
                    5> if the measObject associated with this measId concerns UTRA TDD, GERAN or CDMA2000:
                        6>set the measResult to the quantity as configured for the concerned RAT within the quantityConfig in order of either decreasing quantity for UTRA and GERAN or increasing quantity for CDMA2000 pilotStrength, i.e. the best cell is included first;
                    5> if the measObject associated with this measId concerns WLAN and if ReportConfigInterRAT includes the reportQuantityWLAN:
                        6>set the measResult to include the quantities indicated by the reportQuantityWLAN in order of decreasing measQuantityWLAN within the quantityConfig, i.e. the best cell is included first.
            3> else if the purpose is set to reportCGI:
                4> if the mandatory present fields of the cgi-Info for the cell indicated by the cellForWhichToReportCGI in the associated measObject have been obtained:
                    5> if the cell broadcasts a CSG identity:
                        6>include the csg-Identity;
                        6>include the csg-MemberStatus and set it to member if the cell is a CSG member cell;
                    5> if the si-RequestForHO is configured within the reportConfig associated with this measId:
                        6>include the cgi-Info containing all the fields that have been successfully acquired, except for the plmn-IdentityList;
                    5> else:
                        6>include the cgi-Info containing all the fields that have been successfully acquired;
    1>if the ue-RxTxTimeDiffPeriodical is configured within the corresponding reportConfig for this measId;
        2>                set the ue-RxTxTimeDiffResult to the measurement result provided by lower layers;
        2>                set the currentSFN;
    1> if the includeLocationInfo is configured in the corresponding reportConfig for this measId and detailed location information that has not been reported is available, set the content of the locationInfo as follows:
        2>                include the locationCoordinates;
        2>if available, include the gnss-TOD-msec;
    1> increment the numberOfReportsSent as defined within the VarMeasReportList for this measId by 1;
    1> stop the periodical reporting timer, if running;
    1> if the numberOfReportsSent as defined within the VarMeasReportList for this measId is less than the reportAmount as defined within the corresponding reportConfig for this measId:

TABLE 2-continued

```
        2>start the periodical reporting timer with the value of
reportInterval as defined within the corresponding reportConfig for this measId;
    1> else:
        2>if the triggerType is set to periodical:
            3> remove the entry within the VarMeasReportList for this
measId;
            3>      remove this measId from the measIdList within
VarMeasConfig;
    1> if the measured results are for CDMA2000 HRPD:
        2>  set the preRegistrationStatusHRPD to the UE's CDMA2000
upper layer's HRPD preRegistrationStatus;
    1> if the measured results are for CDMA2000 1xRTT:
        2>  set the preRegistrationStatusHRPD to FALSE;
    1> submit the MeasurementReport message to lower layers for transmission,
upon which the procedure ends;
```

Referring to Table 2, if a measurement object for a random measurement ID is related to WLAN and a reportConfigInterRAT message contains a WLAN report quantity (reportQuantityWLAN), a UE may set measResult including a quantity indicated by the reportQuantityWLAN in decreasing order of measQuantityWLAN within quantityConfig. In doing so, the UE may control a best cell to be situated at a first place in the measResult. A parameter value for a trigger condition for reporting may be transmitted to the UE via reportConfigInterRAT message.

When a UE detects at least two APs, if an eNB receives a measurement result of the at least two APs, the eNB selects an AP appropriate for the UE from a plurality of APs and is then able to inform the UE of the selected AP When the eNB selects the AP appropriate for the UE, at least one of the following metrics may be used.

i) Same Operator: Preferentially select AP of the same operator of UE ii) UE's Priority: Preferentially select AP preferred by UE iii) Channel quality: Preferentially select AP having a good channel state iv) Load balancing: Select AP by considering load distribution v) Carried traffic: Select AP by considering traffic The eNB may send indication, which indicates an AP to be accessed, to the UE using the above enumerated metrics.

According to various embodiments of the present invention, a UE supporting both cellular and WLAN may efficiently select a heterogeneous network for a flow via a control of a cellular network in a wideband wireless communication system.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or may be substituted for corresponding configurations or features of another embodiment. And, it is apparently understandable that a new embodiment may be configured by combining claims failing to have relation of explicit citation in the appended claims together or may be included as new claims by amendment after filing an application.

While the present invention has been described and illustrated herein with reference to the preferred embodiments thereof, it will be apparent to those skilled in the art that various modifications and variations may be made therein without departing from the spirit and scope of the invention. Thus, it is intended that the present invention covers the modifications and variations of this invention that come within the scope of the appended claims and their equivalents.

What is claimed is:

1. A method for transmitting measurement information by a user equipment (UE), the method comprising:
receiving, from a base station (BS) of a first radio network, a first message comprising information of a list of candidate network entities of a second radio network;
receiving, from the BS, a message including information related to an added data radio bearer (DRB) configured for communication with the second radio network;
receiving traffic from a network entity of the candidate network entities through the added DRB;
performing measurements for the list of candidate network entities of the second radio network; and
transmitting, to the BS, the measurement information when a trigger condition is satisfied,
wherein the trigger condition is based on a first relationship between a measured channel quality of the BS and a first threshold and a second relationship between a measured channel quality of any network entity of the candidate network entities and a second threshold.

2. The method of claim 1, wherein the trigger condition is satisfied when the measured channel quality of the BS is worse than the first threshold and the measured channel quality of any AP of the candidate APs is better than the second threshold.

3. The method of claim 1, wherein the message comprises:
an RRC connection reconfiguration message.

4. The method of claim 1, wherein the second radio network is a wireless local area network (WLAN).

5. The method of claim 1, further comprising:
performing an association process with the network entity; and
transmitting, to the BS, information indicating completion of the UE association with the network entity.

6. A user equipment (UE) for transmitting measurement information, the UE comprising:
a transceiver; and
a processor, operatively coupled to the transceiver, wherein the processor is configured to:

control the transceiver to receive, from a base station (BS) of a first radio network, a first message comprising information of a list of candidate network entities of a second radio network;

control the transceiver to receive, from the BS, a message including information related to an added data radio bearer (DRB) configured for communication with the second radio network;

control the transceiver to receive traffic from a network entity of the candidate network entities through the added DRB; and perform measurements for the list of candidate network entities of the second radio network; and control the transceiver to transmit, to the BS, the measurement information when a trigger condition is satisfied, wherein the trigger condition is based on a first relationship between a measured channel quality of the BS and a first threshold and a second relationship between a measured channel quality of any network entity of the candidate network entities and a second threshold.

7. The UE of claim 1, wherein the trigger condition is satisfied when the measured channel quality of the BS is worse than the first threshold and the measured channel quality of any AP of the candidate APs is better than the second threshold.

8. The UE of claim 6, wherein the message comprises: a RRC connection reconfiguration message.

9. The UE of claim 6, wherein the second radio network is a wireless local area network (WLAN).

10. The UE of claim 6, wherein the processor further configured to:

perform an association process with the network entity; and control the transceiver to transmit, to the BS, information indicating completion of the UE association with the network entity.

11. A method for supporting measurements by a base station (BS) in a first radio network, the method comprising:

transmitting, to a user equipment (UE) of the first radio network, a first message comprising information of a list of candidate network entities of a second radio network; and transmitting, to the UE, a message including information related to an added data radio bearer (DRB) configured for communication between the UE and the second radio network, wherein the measurements for the list of candidate network entities of the second radio network is performed when a trigger condition is satisfied, wherein the trigger condition is based on a first relationship between a measured channel quality of the BS and a first threshold and a second relationship between a measured channel quality of any network entity of the candidate network entities and a second threshold.

12. The method of claim 11, wherein the trigger condition is satisfied when the measured channel quality of the BS is worse than the first threshold and the measured channel quality of any AP of the candidate APs is better than the second threshold.

13. The method of claim 11, wherein the message comprises:

an RRC connection reconfiguration message.

14. The method of claim 11, wherein the second radio network is a wireless local area network (WLAN).

* * * * *